(12) United States Patent
Shin et al.

(10) Patent No.: US 11,258,969 B1
(45) Date of Patent: Feb. 22, 2022

(54) IMAGE SENSOR

(71) Applicant: SK hynix Inc., Gyeonggi-do (KR)

(72) Inventors: Min Seok Shin, Gyeonggi-do (KR);
Hak Soon Kim, Gyeonggi-do (KR);
Han Sang Kim, Gyeonggi-do (KR);
Kang Bong Seo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/345,597

(22) Filed: Jun. 11, 2021

(30) Foreign Application Priority Data

Dec. 9, 2020 (KR) .................. 10-2020-0171078

(51) Int. Cl.
*H04N 5/369* (2011.01)
*H04N 5/376* (2011.01)
*H04N 13/271* (2018.01)

(52) U.S. Cl.
CPC ....... *H04N 5/36965* (2018.08); *H04N 5/3765* (2013.01); *H04N 13/271* (2018.05); *G06T 2207/10028* (2013.01); *H04N 2213/003* (2013.01)

(58) Field of Classification Search
CPC ............. H04N 5/36965; H04N 13/271; H04N 5/3765; H04N 2213/003; G06T 2207/10028

USPC .................................................. 348/294–324
See application file for complete search history.

(56) References Cited

U.S. PATENT DOCUMENTS 10,054,673 B2  8/2018  Cardei
2008/0036996 A1*  2/2008  O'Connor ............. G01C 25/00
                                                  356/5.01

* cited by examiner

*Primary Examiner* — Yogesh K Aggarwal
(74) *Attorney, Agent, or Firm* — IP & T Group LLP

(57) ABSTRACT

An image sensor includes: first lines transferring a first clock having the same phase as that of modulated light in a first phase and a third clock having a phase difference of a ½ cycle from the phase of the modulated light in a second phase; second lines transferring the third clock in the first phase and the first clock in the second phase; third lines transferring a second clock having a phase difference of a ¼ cycle from the phase of the modulated light in the first phase and a fourth clock having a phase difference of a ¾ cycle from the phase of the modulated light in the second phase; fourth lines transferring the fourth clock in the first phase and the second clock in the second phase; and a pixel array including first pixels and second pixels that are alternately arranged in row and column directions.

13 Claims, 7 Drawing Sheets

<Phase 1>

<Phase 2>

<Phase 3>

<Phase 4>

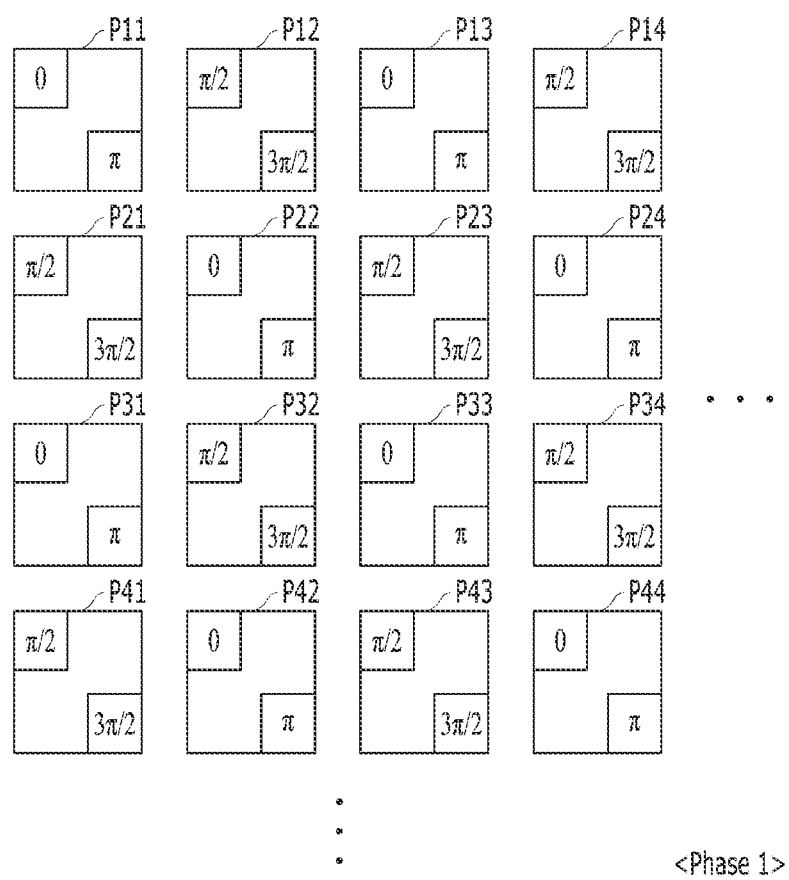

IMAGE SENSOR

CROSS-REFERENCE TO RELATED APPLICATIONS

The present application claims priority of Korean Patent Application No, 10-2020-0171078, filed on Dec. 9, 2020, which is incorporated herein by reference in its entirety.

BACKGROUND

1. Field

Various embodiments of the present invention relate to an image sensor, and more particularly, to an image sensor capable of sensing distance information.

2. Description of the Related Art

The image sensor is mounted on a smart phone or a digital camera to capture an image, convert the image into electrical signals, convert the electrical image signals into digital signals, and transfer the digital signals. The 3D image sensor collects relative distance/depth information with respect to a target object to generate a 3D image, and the 3D image is called a distance or depth image.

The 3D image sensor irradiates modulated light onto an object, detects the reflected light and calculates the distance based on the phase difference between the modulated light and the reflected light.

SUMMARY

Embodiments of the present invention are directed to a technology that efficiently supplies clocks of diverse phases to a pixel array of an image sensor.

In accordance with an embodiment of the present invention, an image sensor includes: a plurality of first lines transferring a first clock having the same phase as a phase of a modulated light in a first phase and transferring a third clock having a phase difference of a ½ cycle from the phase of the modulated light in a second phase; a plurality of second lines transferring the third clock in the first phase and transferring the first clock in the second phase; a plurality of third lines transferring a second clock having a phase difference of a ¼ cycle from the phase of the modulated light in the first phase and transferring a fourth clock having a phase difference of a ¾ cycle from the phase of the modulated light in the second phase; a plurality of fourth lines transferring the fourth clock in the first phase and transferring the second clock in the second phase; and a pixel array including a plurality of first pixels and a plurality of second pixels that are alternately arranged in a row direction and a column direction, wherein each of the first pixels includes an A tab to which one of the first lines is coupled and a B tab to which one of the second lines is coupled, and wherein each of the second pixels includes an A tab to which one of the third lines is coupled and a tab B to which one of the fourth lines is coupled.

In accordance with another embodiment of the present invention, an image sensor includes: a pixel array in which a plurality of first pixels and a plurality of second pixels are alternately arranged in a row direction and a column direction; a plurality of first lines formed along odd columns among the columns of the pixel array, coupled to A tabs of the first pixels of a corresponding column, transferring a first clock having the same phase as a phase of modulated light in a first phase, and transferring a third clock having a phase difference of a ½ cycle from the phase of the modulated light in a second phase; a plurality of second lines formed along the odd columns among the columns of the pixel array, coupled to B tabs of the first pixels of a corresponding column, transferring the third clock in the first phase, and transferring the first clock in the second phase; a plurality of third lines formed along even columns among the columns of the pixel array, coupled to A tabs of the second pixels of a corresponding column, transferring a second clock having a phase difference of a ¼ cycle from the phase of the modulated light in the first phase, and transferring a fourth clock having a phase difference of a ¾ cycle from the phase of the modulated light in the second phase; and a plurality of fourth lines formed along the even columns among the columns of the pixel array, coupled to B tabs of the second pixels of a corresponding column, transferring the fourth clock in the first phase, and transferring a third clock in the second phase.

In accordance with yet another embodiment of the present invention, an image sensor includes: a pixel array including a plurality of first pixels and a plurality of second pixels that are alternately arranged in a row direction and a column direction; a plurality of first lines formed along one column for every three columns of the pixel array, coupled to A tabs of the first pixels of a corresponding column, transferring a first clock having the same phase as a phase of modulated light in a first phase, and transferring a third clock having a phase difference of a ½ cycle from the phase of the modulated light in a second phase; a plurality of second lines formed along columns next to the columns where the first lines are formed, coupled to the A tabs of the first pixels of a corresponding column, transferring the third clock in the first phase, and transferring the first clock in the second phase; a plurality of third lines formed along one row for every three rows of the pixel array, coupled to A tabs of the second pixels of a corresponding row, transferring a second clock having a phase difference of a ¼ cycle from the phase of the modulated light in the first phase, and transferring a fourth clock having a phase difference of a ¾ cycle from the phase of the modulated light in the second phase; and a plurality of fourth lines formed along rows next to the rows where the third lines are formed, coupled to the B tabs of the second pixels of a corresponding column, transferring the fourth clock in the first phase, and transferring the second clock in the second phase.

In accordance with still another embodiment of the present invention, an image sensor includes: a pixel array including a plurality of first pixels and a plurality of second pixels that are alternately arranged in a row direction and a column direction, wherein each of the first pixels and the second pixels includes an A tab and a B tab, wherein, in a first phase operation, a first clock is applied to the A tabs of the first pixels, and a third clock having a phase difference of a ½ cycle from a phase of the first clock is applied to the B tabs of the first pixels, and a second clock having a phase difference of a ¼ cycle from the phase of the first clock is applied to the A tabs of the second pixels, and a fourth clock having a phase difference of a ¾ cycle from the phase of the third clock is applied to the B tabs of the second pixels, and wherein, in a second phase operation, the third clock is applied to the A tabs of the first pixels, and the first clock is applied to the B tabs of the first pixels, and the fourth clock is applied to the A tabs of the second pixels, and the second clock is applied to the B tabs of the second pixels.

In accordance with still another embodiment of the present invention, an image sensor includes: a pixel array including first and second pixels each including A and B tabs; one or more first lines electrically coupled to one another and configured to transfer, to the A tabs of the first pixels, a first clock in a first operation and a third clock in a second operation; one or more second lines electrically coupled to one another and configured to transfer, to the B tabs of the first pixels, the third clock in the first operation and the first clock in the second operation; one or more third lines electrically coupled to one another and configured to transfer, to the A tabs of the second pixels, a second clock in the first operation and a fourth clock in the second operation; and one or more fourth lines electrically coupled to one another and configured to transfer, to the B tabs of the second pixels, the fourth clock in the first operation and the second clock in the second operation, wherein the first pixels are arranged at odd columns in odd rows and at even columns in even rows within the array, wherein the second pixels are arranged at the even columns in the odd rows and at the odd columns in the even rows within the array, wherein the first clock has the same frequency and phase as a modulated light, wherein the second clock has a phase difference of a ¼ cycle from the first clock, wherein the third clock has a phase difference of a ½ cycle from the first clock, and wherein the fourth clock has a phase difference of a ¾ cycle from the first clock.

BRIEF DESCRIPTION OF THE DRAWINGS

FIGS. 2A and 2B illustrate clocks applied to A and B tabs of the pixels of a pixel array in two phases to extract depth information through two phase operations.

DETAILED DESCRIPTION

Figure 1A:
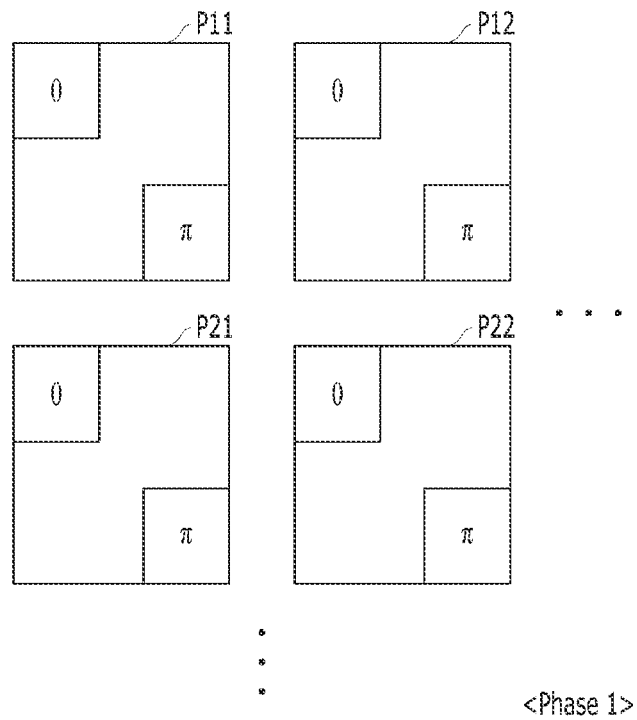
FIGS. 1A, 1B, 1C, and 1D illustrate clocks applied to A and B tabs of the pixels of a pixel array in four phases to extract depth information.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An Indirect Time of Flight (ToF) image sensor of an indirect scheme that extracts depth information may adopt a 2-tab, 4-phase modulation method to remove errors caused by background light. To create a single depth image or depth map, a clock having the same frequency and phase as those of the modulated light, a clock having the same frequency and a phase difference of a ¼ cycle (=90°=π/2), a clock having the same frequency and a phase difference of a ½ cycle (=180°=π), and a clock having the same frequency and a phase difference of a ¾ cycle (=270°=3π/2) may be applied to an A tab of a pixel. At the same time, a clock with a phase difference of a ½ cycle from the clock applied to the A tab may be applied to a B tab of the pixel. Here, the modulated light may refer to the light irradiated to the object. Since infrared rays are generally used as the modulated light, the modulated light may also be called a pulsed IR (InfraRed) modulation signal.

FIGS. 1A, 1B, 1C and 1D illustrate clocks applied to A and B tabs of the pixels of a pixel array in four phases to extract depth information.

FIG. 1A is a diagram illustrating clocks applied to pixels P11, P12, P21 and P22 in a first phase Phase 1. Referring to FIG. 1A, in the first phase, a clock 0 having the same frequency and phase as those of modulated light may be applied to the A tabs (the square on the upper left portion of each pixel) of the pixels P11, P12, P21 and P22, and a clock n having the same frequency as that of the modulated light and a phase difference of a ½ cycle may be applied to the B tabs (the square on the bottom right of each pixel). In the first phase, the light detectors of the A tabs of the pixels P11, P12, P21 and P22 may detect the reflected light in synchronization with the clock 0, and the light detectors of the B tabs of the pixels P11, P12, P21 and P22 may detect a reflected light, which is a light of the modulated light that returns as the modulated light is reflected off an object, in synchronization with the clock n. Herein, the phase difference between the modulated light and the reflected light may be measured based on the amount of the reflected light detected in the A tabs of the pixels P11, P12, P21 and P22 and the amount of the reflected light detected in the B tabs of the pixels P11, P12, P21 and P22.

Figure 1B:
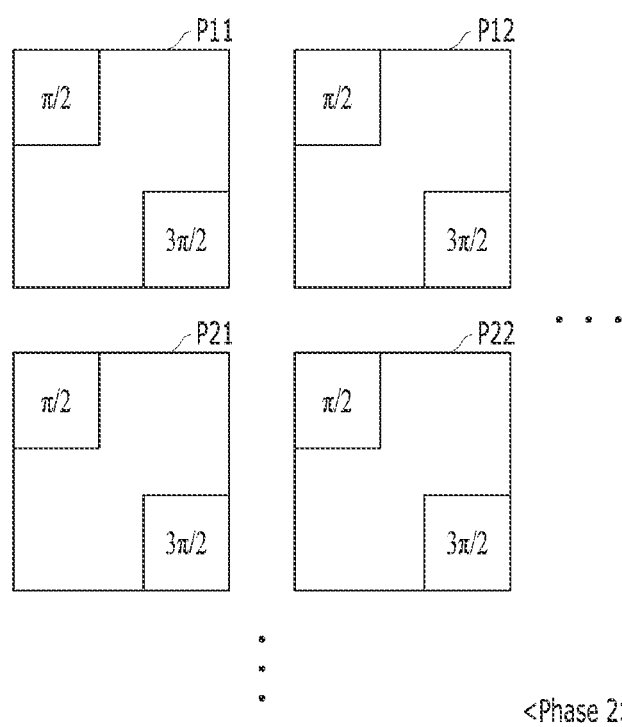

FIG. 1B is a diagram illustrating clocks applied to the pixels P11, P12, P21 and P22 in a second phase Phase 2. Referring to FIG. 1B, in the second phase, a clock π/2 having the same frequency as that of the modulated light and a phase difference of a ¼ cycle may be applied to the A tabs (the square on the upper left portion of each pixel) of the pixels P11, P12, P21 and P22, and a clock 3π/2 having the same frequency as that of the modulated light and a phase difference of a ¾ cycle may be applied to the B tabs (the square on the bottom right portion of each pixel). In the second phase, the light detectors of the A tabs of the pixels P11, P12, P21 and P22 may detect the reflected light in synchronization with the clock π/2 and the light detectors of the B tabs of the pixels P11, P12, P21 and P22 may detect the reflected light in synchronization with the clock 3π/2. Also, the phase difference between the modulated light and the reflected light may be measured based on the amount of the reflected light detected in the A tabs of the pixels P11, P12, P21 and P22 and the amount of the reflected light detected in the B tabs of the pixels P11, P12, P21 and P22.

Figure 1C:
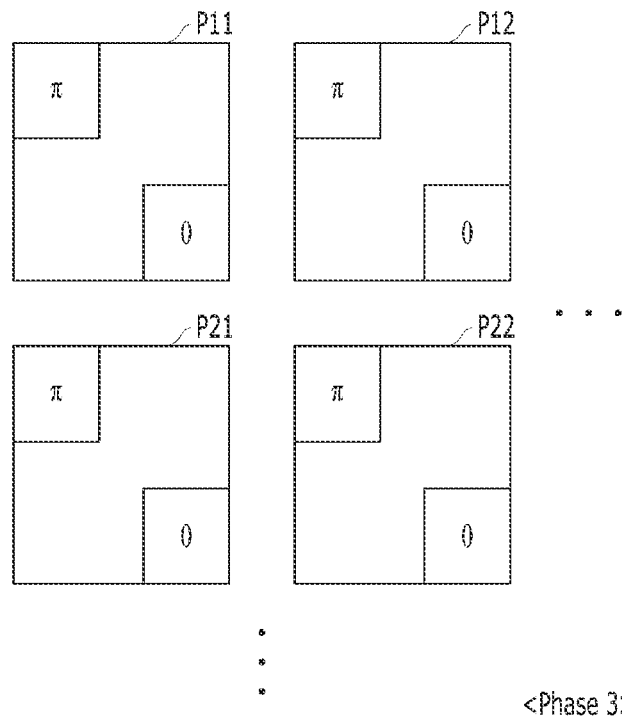
Figure 1D:
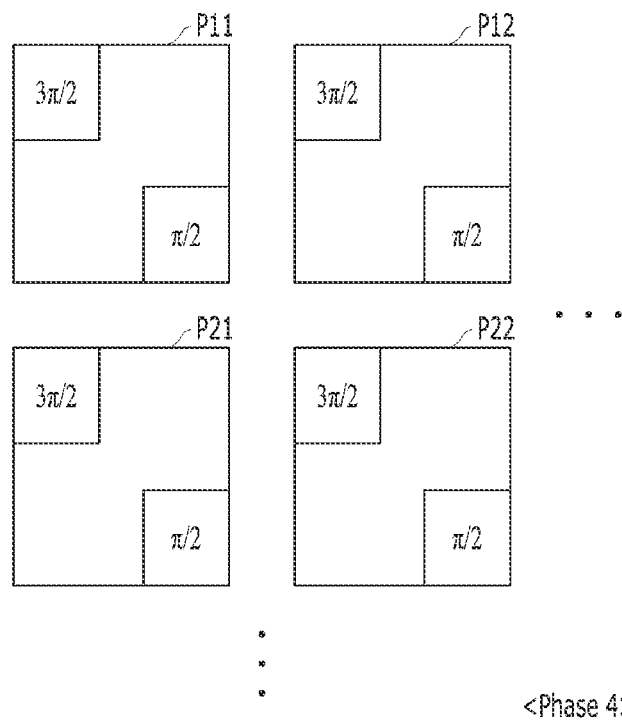

FIG. 1C is a diagram illustrating clocks applied to the pixels P11, P12, P21 and P22 in a third phase Phase 3. Referring to FIG. 1C, in the third phase, a clock π having the same frequency as that of the modulated light and a phase difference of a ½ cycle may be applied to the A tabs (the square on the upper left portion of each pixel) of the pixels P11, P12, P21 and P22, and a clock 0 having the same frequency and phase as those of the modulated light may be applied to the B tabs (the square on the bottom right portion of each pixel). In the third phase, the light detectors of the A tabs of the pixels P11, P12, P21 and P22 may detect the reflected light in synchronization with the clock π and the light detectors of the B tabs of the pixels P11, P12, P21 and P22 may detect the reflected light in synchronization with the clock 0. Also, the phase difference between the modulated light and the reflected light may be measured based on the amount of the reflected light detected in the A tabs of the pixels P11, P12, P21 and P22 and the amount of the reflected light detected in the B tabs of the pixels P11, P12, P21 and P22, FIG. 1D is a diagram illustrating clocks applied to the pixels P11, P12, P21 and P22 in a fourth phase Phase 4. Referring to FIG. 1D, in the fourth phase, a clock $3\pi/2$ having the same frequency as that of the modulated light and a phase difference of a ¾ cycle may be applied to the A tabs (the square on the upper left portion of each pixel) of the pixels P11, P12, P21 and P22, and a clock $\pi/2$ having the same frequency as that of the modulated light and a phase difference of a ¼ cycle may be applied to the B tabs (the square on the bottom right portion of each pixel). In the fourth phase, the light detectors of the A tabs of the pixels P11, P12, P21 and P22 may detect the reflected light in synchronization with the clock $3\pi/2$ and the light detectors of the B tabs of the pixels P11, P12, P21 and P22 may detect the reflected light in synchronization with the clock $\pi/2$. Also, the phase difference between the modulated light and the reflected light may be measured based on the amount of the reflected light detected in the A tabs of the pixels P11, P12, P21 and P22 and the amount of the reflected light detected in the B tabs of the pixels P11, P12, P21 and P22.

Using the information collected in the four phase operations shown in FIGS. 1A, 1B, 1C, and 1D, an accurate depth image from which an error caused by background light is removed may be generated. However, since an exposure operation and a readout operation have to be performed in each phase, a total of 4 exposure operations and 4 readout operations may have to be performed to generate one depth image. Therefore, it is disadvantageous in that it takes more time and current to obtain a depth image.

Figure 2B:
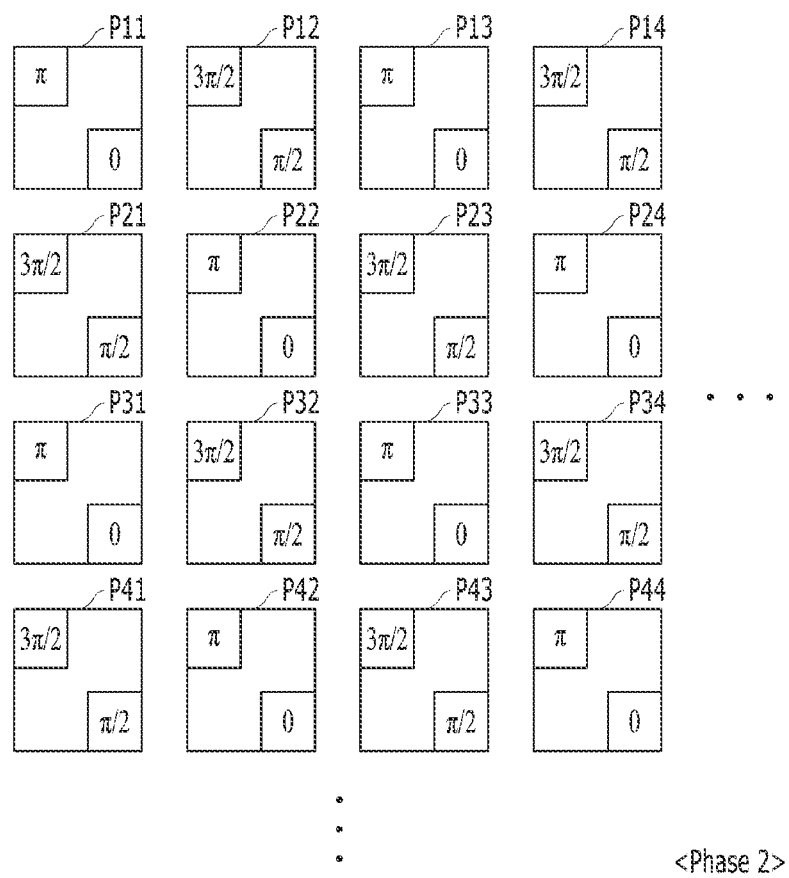

FIGS. 2A and 2B illustrate clocks applied to the A and B tabs of the pixels of a pixel array in two phases to extract depth information through two phase operations.

FIG. 2A is a diagram illustrating clocks applied to pixels P11 to P44 in a first phase Phase 1. Referring to FIG. 2A, a clock 0 having the same frequency and phase as those of modulated light may be applied to the A tabs of the first pixels P11, P13, P22, P24, P31, P33, P42 and P44 positioned in the black color portion of a checkerboard pattern, and a clock $\pi$ having the same frequency as that of the modulated light and a phase difference of a ½ cycle may be applied to the B tabs of the first pixels P11, P13, P22, P24, P31, P33, P42 and P44. Also, a clock $\pi/2$ having the same frequency as that of the modulated light and a phase difference of a ¼ cycle may be applied to the A tabs of the second pixels P12, P14, P21, P23, P32, P34, P41 and P43 positioned in the white color portion of the checkerboard pattern, and a clock $3\pi/2$ having the same frequency as that of the modulated light and a phase difference of a ¾ cycle may be applied to the B tabs of the second pixels P12, P14, P21, P23, P32, P34, P41 and P43.

In the first phase, information on the amount of reflected light received in synchronization with the clock 0 and the amount of reflected light received in synchronization with the clock $\pi$ may be generated in the first pixels P11, P13, P22, P24, P31, P33, P42 and P44. Also, information on the amount of reflected light received in synchronization with the clock $\pi/2$ and the amount of reflected light received in synchronization with the clock $3\pi/2$ may be generated in the second pixels P12, P14, P21, P23, P32, P34, P41 and P43.

Also, information on the amount of the reflected light received in synchronization with the clock $\pi/2$ and the amount of the reflected light received in synchronization with the clock $3\pi/2$ may be generated at the positions of the first pixels P11, P13, P22, P24, P31, P33, P42 and P44, too, by using well-known interpolation. Also, information on the amount of the reflected light received in synchronization with the clock 0 and the amount of the reflected light received in synchronization with the clock $\pi$ may be generated at the positions of the second pixels P12, P14, P21, P23, P32, P34, P41 and P43, too, by using interpolation. For example, information on the amount of the reflected light received in synchronization with the clock $\pi/2$ and the amount of the reflected light received in synchronization with the clock $3\pi/2$ may be generated at the position of the first pixel P32 by interpolating the information generated in the second pixels P22, P31, P33, and P42 which are adjacent to the first pixel P32. Likewise, information on the amount of the reflected light received in synchronization with the clock 0 and the amount of the reflected light received in synchronization with the clock $\pi$ may be generated at the second pixel P33 by interpolating the information generated in the first pixels P23, P32, P34, and P43 which are adjacent to the second pixel P33.

FIG. 2B is a diagram illustrating clocks applied to the pixels P11 to P44 in a second phase Phase 2. Referring to FIG. 2B, the clock $\pi$ having the same frequency as that of the modulated light and a phase difference of a ½ cycle may be applied to the A tabs of the first pixels P11, P13, P22, P24, P31, P33, P42, and P44 positioned in the black color portion of the checkerboard pattern, and the clock 0 having the same frequency and phase as those of the modulated light may be applied to the B tabs of the first pixels P11, P13, P22, P24, P31, P33, P42, and P44. Also, the clock $3\pi/2$ having the same frequency as that of the modulated light and a phase difference of a ¾ cycle may be applied to the A tabs of the second pixels P12, P14, P21, P23, P32, P34, P41 and P43 positioned in the white color portion of the checkerboard pattern, and the clock $\pi/2$ having the same frequency as that of the modulated light and a phase difference of a ¼ cycle may be applied to the B tabs of the second pixels P12, P14, P21, P23, P32, P34, P41 and P43.

In the second phase, information on the amount of the reflected light received in synchronization with the clock $\pi$ and the amount of the reflected light received in synchronization with the clock 0 may be generated in the first pixels P11, P13, P22, P24, P31, P33, P42 and P44, and information on the amount of the reflected light received in synchronization with the clock $3\pi/2$ and the amount of the reflected light received in synchronization with the clock $\pi/2$ may be generated in second pixels second pixels P12, P14, P21, P23, P32, P34, P41 and P43. Also, information on the amount of the reflected light received in synchronization with the clock $3\pi/2$ and the amount of the reflected light received in synchronization with the clock $\pi/2$ may be generated at the positions of the first pixels P11, P13, P22, P24, P31, P33, P42 and P44, too, by using interpolation, and information on the amount of the reflected light received in synchronization with the clock $\pi$ and the amount of the reflected light received in synchronization with the clock 0 may be generated at the positions of the second pixels P12, P14, P21, P23, P32, P34, P41 and P43, too, by using interpolation. For example, information on the amount of the reflected light received in synchronization with the clock $\pi$ and the amount of the reflected light received in synchronization with the clock 0 may be generated at the position of the first pixel P32 by interpolating the information generated in the second pixels P22, P31, P33 and P42 that are adjacent to the first pixel P32. Likewise, information on the amount of the reflected light received in synchronization with the clock $3\pi/2$ and the amount of the reflected light received in synchronization with the clock $\pi/2$ may be generated at the position of the second pixel P33 by interpolating the information generated in the first pixels P23, P32, P34 and P43 that are adjacent to the second pixel P33.

Referring to FIGS. 2A and 2B, when clocks 0, π/2, n and 3π/2 are applied to the pixels P11 to P44 in the first phase and the second phase and interpolation is used, the same information as the information obtained in the four phases of FIGS. 1A, 1B, 1C and 1D may be obtained by the operation of two phases. In other words, a depth image may be obtained through the operation of two phases. Therefore, it is possible to reduce the time and current consumption required to acquire a depth image.

Referring to FIGS. 2A and 2B, when the clocks 0, π/2, n and 3π/2 are applied to the pixels P11 to P44 and the interpolation is used, a depth image may be generated by the operation of two phases. However, since different clocks have to be supplied to the A and B tabs of the first pixels P11, P13, P22, P24, P31, P33, P42 and P44, and the A and B tabs of the second pixels P12, P14, P21, P23, P32, P34, P41 and P43, it is not easy to apply clocks to the pixel array.

Figure 3:
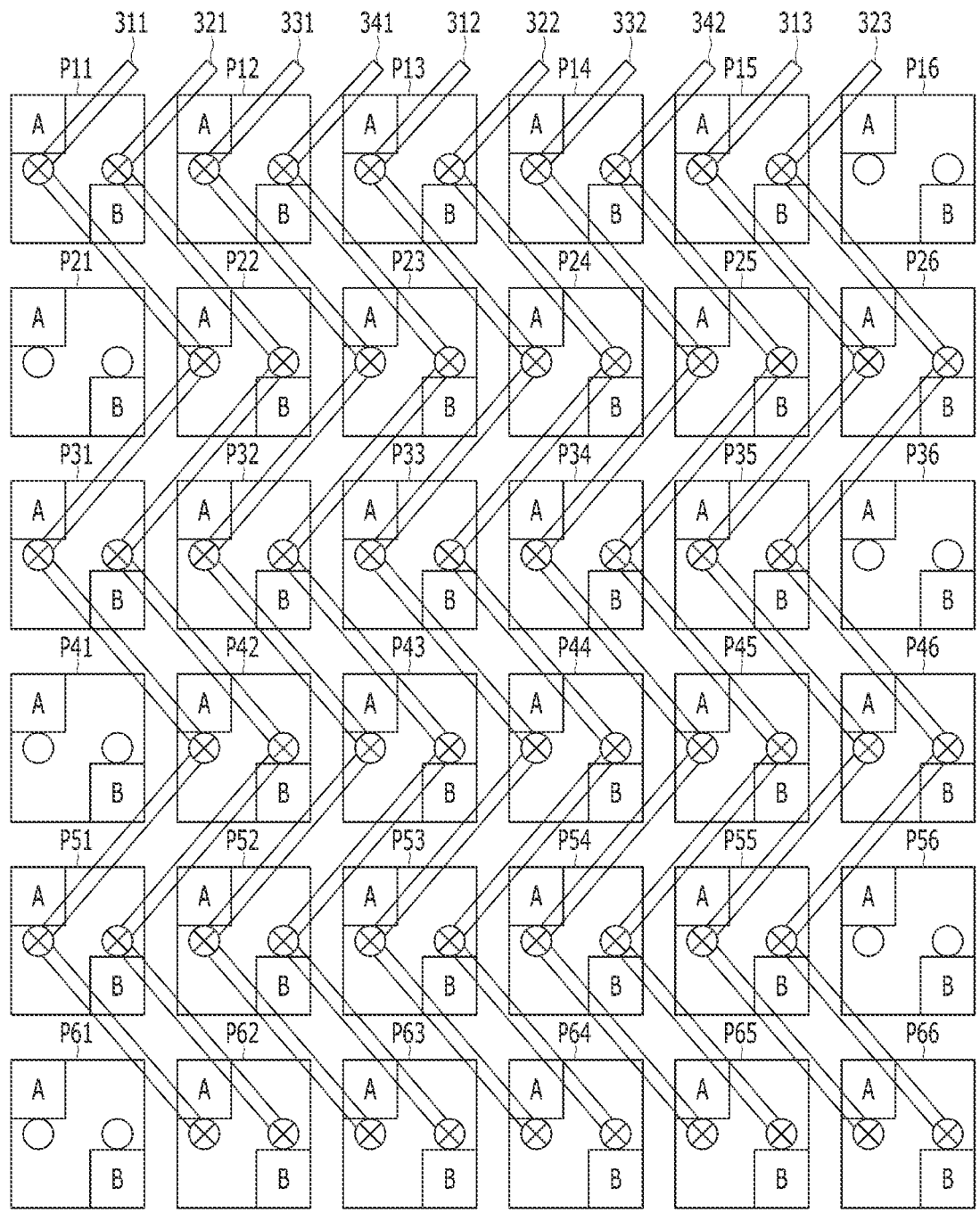
FIG. 3 is a diagram illustrating an it gage sensor in accordance with an embodiment of the present invention.

FIG. 3 is a diagram illustrating an image sensor in accordance with an embodiment of the present invention.

Referring to FIG. 3, the image sensor may include a pixel array including pixels P11 to P66 that are arranged in a plurality of rows and a plurality of columns, a plurality of first lines 311 to 313, a plurality of second lines 321 to 323, a plurality of third lines 331 and 332, and a plurality of fourth lines 341 and 342. The mark "X" in the drawing may indicate the contact between the lines 311 to 313, 321 to 323, 331, 332, 341 and 342 and the tabs.

The pixels P11 to P66 may include first pixels P11, P13, P15, P22, P24, P26, P31, P33, P35, P42, P44, P46, P51, P53, P55, P62, P64 and P66, and second pixels P12, P14, P16, P21, P23, P25, P32, P34, P36, P41, P43, P45, P52, P54, P56, P61, P63 and P65. The first pixels P11, P13, P15, P22, P24, P26, P31, P33, P35, P42, P44, P46, P51, P53, P55, P62, P64 and P66 and the second pixels P12, P14, P16, P21, P23, P25, P32, P34, P36, P41, P43, P45, P52, P54, P56, P61, P63 and P65 may be arranged alternately in a row direction and a column direction. The first pixels P11, P13, P15, P22, P24, P26, P31, P33, P35, P42, P44, P46, P51, P53, P55, P62, P64 and P66 may operate by receiving a clock 0 applied to the A tabs and receiving a clock π applied to the B tabs in a first phase and may operate by receiving a clock π applied to the A tabs and receiving a clock 0 applied to the B tabs in a second phase. The second pixels P12, P14, P16, P21, P23, P25, P32, P34, P36, P41, P43, P45, P52, P54, P56, P61, P63 and P65 may operate by receiving a clock π/2 applied to the A tabs and receiving a clock 3π/2 applied to the B tabs in the first phase and may operate by receiving a clock 3π/2 applied to the A tabs and receiving a clock π/2 applied to the B tabs in the second phase.

The first lines 311 to 313 may be lines for supplying a clock to the A tabs of the first pixels P11, P13, P15, P22, P24, P26, P31, P33, P35, P42, P44, P46, P51, P53, P55, P62, P64 and P66, and the first lines 311 to 313 may apply a clock 0 in the first phase and apply a clock π in the second phase. The first lines 311 to 313 may be formed to proceed in a column direction while alternately contacting two columns in zigzag. For example, the first lines 311 to 313 may be formed to proceed in the column direction while alternately contacting the A tabs of the first pixels P11, P31 and P51 that are positioned in the first column and the A tabs of the first pixels P22, P42 and P62 that are positioned in the second column.

The second lines 321 to 323 may be lines for supplying a clock to the B tabs of the first pixels P11, P13, P15, P22, P24, P26, P31, P33, P35, P42, P44, P46, P51, P53, P55, P62, P64 and P66, and may supply a clock π in the first phase and supply a clock 0 in the second phase. The second lines 321 to 323 may be formed to proceed in the column direction while alternately contacting two columns in zigzag. For example, the second line 322 may be formed to proceed in the column direction while alternately contacting the B tabs of the first pixels P13, P33 and P53 that are positioned in the third column and the B tabs of the first pixels P24, P44 and P64 that are positioned in the fourth column.

The third lines 331 and 332 may be lines for supplying a clock to the A tabs of the second pixels P12, P14, P16, P21, P23, P25, P32, P34, P36, P41, P43, P45, P52, P54, P56, P61, P63 and P65, and may supply a clock π/2 in the first phase and supply a clock 3π/2 in the second phase. The third lines 331 to 332 may be formed to proceed in the column direction while alternately contacting two columns in zigzag. For example, the third line 332 may be formed to proceed in the column direction while alternately contacting the A tabs of the second pixels P14, P34 and P54 that are positioned in the fourth column and the A tabs of the second pixels P25, P45 and P65 that are positioned in the fifth column.

The fourth lines 341 and 342 may be lines for supplying a clock to the B tabs of the second pixels P12, P14, P16, P21, P23, P25, P32, P34, P36, P41, P43, P45, P52, P54, P56, P61, P63 and P65, and may supply a clock 3π/2 in the first phase and supply a clock π/2 in the second phase. The fourth lines 341 to 342 may be formed to proceed in the column direction while alternately contacting two columns in zigzag. For example, the fourth line 341 may be formed to proceed in the column direction while alternately contacting the B tabs of the second pixels P12, P32 and P52 that are positioned in the second column and the B tabs of the second pixels P23, P43 and P63 that are positioned in the third column.

The first to fourth lines 311 to 313, 321 to 323, 331, 332, 341, and 342 may be formed to couple the tabs that they contact in a straight line as illustrated in FIG. 3. For example, the first line 311 may couple the A tab of the pixel P11 and the A tab of the pixel P22 in a straight line, and couple the A tab of the pixel P22 and the A tab of the pixel P31 in a straight line. The circles of FIG. 3 may represent the contact between the lines 311 to 313, 321 to 323, 331, 332, 341 and 342 and the tabs of the pixels P11 to P66.

Figure 4:
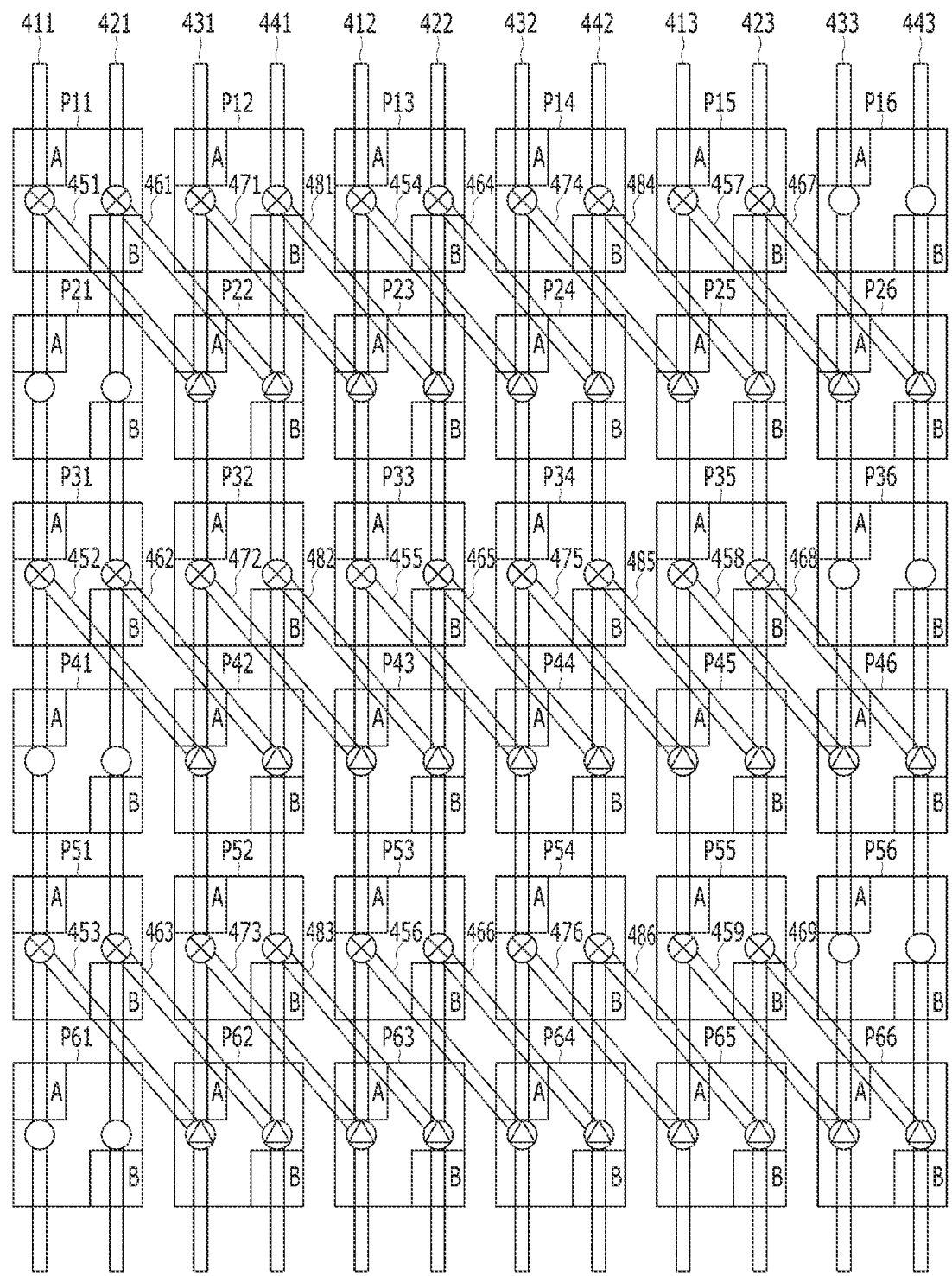
FIG. 4 is a diagram illustrating an image sensor in accordance with another embodiment of the present invention.

FIG. 4 is a diagram illustrating an image sensor in accordance with another embodiment of the present invention.

Referring to FIG. 4, the image sensor may include a pixel array including pixels P11 to P66 that are arranged in a plurality of rows and a plurality of columns, a plurality of first lines 411 to 413, plurality of second lines 421 to 423, a plurality of third lines 431 to 433, a plurality of fourth lines 441 to 443, a plurality of first sub-lines 451 to 459, a plurality of second sub-lines 461 to 469, a plurality of third sub-lines 471 to 476, and a plurality of fourth sub-lines 481 to 486. The mark "X" in the drawing may indicate the contact between the lines 411 to 313, 421 to 423, 431 to 433, and 441 to 443 and the tabs, and the mark "Δ" in the drawing may indicate the sub-lines 451 to 459, 461 to 469, 471 to 476, and 481 to 486 and the tabs.

The first lines 411 to 413 may be formed along the odd columns among the columns of the pixel array, and the first lines 411 to 413 may be coupled to the A tabs of the first pixels P11, P31, P51, P13, P33, P53, P15, P35 and P55 of the corresponding column. The first lines 411 to 413 may supply the clock 0 in the first phase and the clock $\pi$ in the second phase. The first lines 411 to 413 may be formed as a straight line.

The first sub-lines 451 to 459 may be coupled to the first lines 411 to 413 so that a clock may be supplied to the A tabs of the first pixels P22, P42, P62, P24, P44, P64, P26, P46 and P66 of the even columns. The first sub-lines 451 to 459 may couple the A tabs of the first pixels P11, P31, P51, P13, P33, P53, P15, P35 and P55 of the odd columns to the A tabs of the first pixels P22, P42, P62, P24, P44, P64, P26, P46 and P66 that are positioned at a next column and a next row with respect to the first pixels P11, P31, P51, P13, P33, P53, P15, P35 and P55 of the odd columns. For example, the first sub-line 455 may couple the A tab of the first pixel P33 to the A tab of the first pixel P44 positioned at a next column and a next row with respect to the first pixel P33.

The second lines 421 to 423 may be formed along the odd columns among the columns of the pixel array, and the second lines 421 to 423 may be coupled to the B tabs of the first pixels P11, P31, P51, P13, P33, P53, P15, P35 and P55 of the corresponding column. The second lines 421 to 423 may supply the clock $\pi$ in the first phase and supply the clock 0 in the second phase. The second lines 421 to 423 may be formed as a straight line.

The second sub-lines 461 to 469 may be coupled to the second lines 421 to 423 so that they may supply a clock to the B tabs of the first pixels P22, P42, P62, P24, P44, P64, P26, P46 and P66 of the even columns. The second sub-lines 461 to 469 may couple the B tabs of the first pixels P11, P31, P51, P13, P33, P53, P15, P35 and P55 of the odd columns to the B tabs of the first pixels P22, P42, P62, P24, P44, P64, P26, P46 and P66 positioned at a next column and a next row with respect to the first pixels P11, P31, P51, P13, P33, P53, P15, P35 and P55 of the odd columns. For example, the second sub-line 461 may couple the B tab of the first pixel P11 to the B tab of the first pixel P22 positioned at a next column and a next row with respect to the first pixel P11.

The third lines 431 to 433 may be formed along the even columns among the columns of the pixel array, and the third lines 431 to 433 may be coupled to the A tabs of the second pixels P12, P32, P52, P14, P34, P54, P16, P36 and P56 of the corresponding columns. The third lines 431 to 433 may supply the clock $\pi/2$ in the first phase and supply the clock $3\pi/2$ in the second phase. The third lines 431 to 433 may be formed as a straight line.

The third sub-lines 471 to 476 may be coupled to the third lines 431 and 432 and supply a clock to the A tabs of the second pixels P23, P43, P63, P25, P45 and P65 of the odd columns. The third sub-lines 471 to 476 may couple the A tabs of the second pixels P12, P32, P52, P14, P34 and P54 of the even columns to the A tabs of the second pixels P23, P43, P63, P25, P45 and P65 positioned at a next column and a next row with respect to the second pixels P12, P32, P52, P14, P34 and P54 of the even columns. For example, the third sub-line 473 may couple the A tab of the second pixel P52 to the A tab of the second pixel P63 positioned at a next column and a next row with respect to the second pixel P52.

The fourth lines 441 to 443 may be formed along the even columns among the columns of the pixel array, and the fourth lines 441 to 443 may be coupled to the B tabs of the second pixels P12, P32, P52, P14, P34, P54, P16, P36 and P56 of the corresponding columns. The fourth lines 441 to 443 may supply the clock $3\pi/2$ in the first phase and supply the clock $\pi/2$ in the second phase. The fourth lines 441 to 443 may be formed as a straight line.

The fourth sub-lines 481 to 486 may be coupled to the fourth lines 441 and 442 to supply a clock to the B tabs of the second pixels P23, P43, P63, P25, P45 and P65 of the odd columns. The fourth sub-lines 481 to 486 may couple the B tabs of the second pixels P12, P32, P52, P14, P34 and P54 of the even columns to the B tabs of the second pixels P23, P43, P63, P25, P45 and P65 positioned at a next column and a next row with respect to the second pixels P12, P32, P52, P14, P34 and P54 of the even columns. For example, the fourth sub-line 481 may couple the B tab of the second pixel P12 to the B tab of the second pixel P23 positioned at a next column and a next row with respect to the second pixel P12.

Since the lines 411 to 413, 421 to 423, 431 to 433 and 441 to 443 and the sub-lines 451 to 459, 461 to 469, 471 to 476 and 481 to 486 may overlap with each other, the lines 411 to 413, 421 to 423, 431 to 433 and 441 to 443 and the sub-lines 451 to 459, 461 to 469, 471 to 476 and 481 to 486 may be wired in different layers.

Here, the terms "even" and "odd" are used to distinguish the columns from each other and the terms are not used to represent literally even and odd numbers. For example, it is illustrated herein that the even columns are 2, 4 and 6 columns and the odd columns are 1, 3 and 5 columns, but the even columns may be 1, 3 and 5 columns, and the odd columns may be 2, 4 and 6 columns. In other words, the terms "even" and "odd" are used to distinguish two alternate objects, FIG. 5 is a diagram illustrating an image sensor in accordance with yet another embodiment of the present invention.

Figure 5:
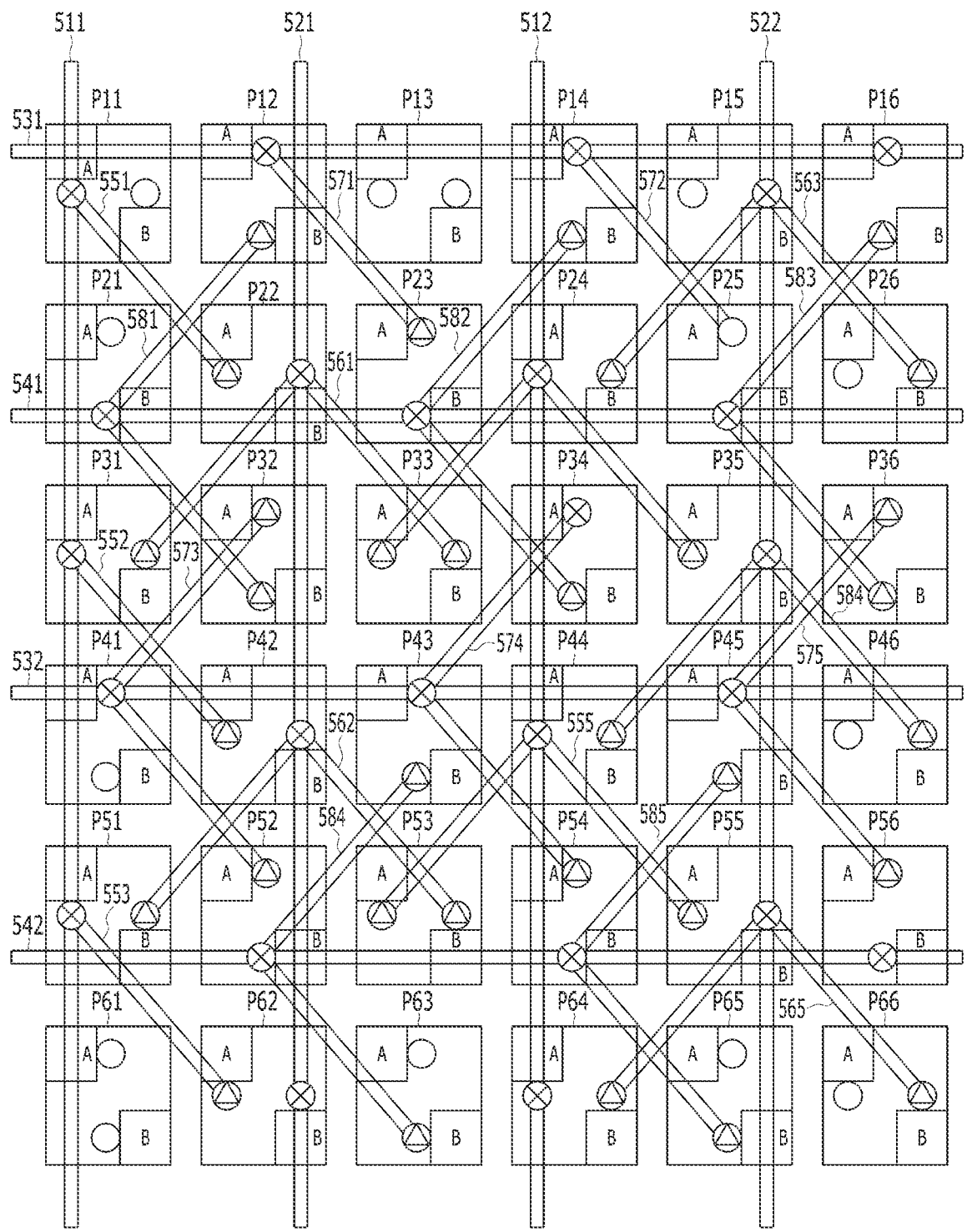
FIG. 5 is a diagram illustrating an image sensor in accordance with yet another embodiment of the present invention.

Referring to FIG. 5, the image sensor may include a pixel array including pixels P11 to P66 arranged in a plurality of rows and a plurality of columns, a plurality of first lines 511 and 512, a plurality of second lines 521 and 522, a plurality of third lines 531 and 532, a plurality of fourth lines 541 and 542, a plurality of first sub-lines 551 to 555, a plurality of second sub-lines 561 to 565, a plurality of third sub-lines 571 to 575, and a plurality of fourth sub-lines 581 to 585. The mark "X" in the drawing may indicate the contact between the lines 511, 512, 521, 522, 531, 532, 541 and 542 and the tabs, and the mark "Δ" in the drawing may indicate the contact between the sub-lines 551 to 555, 561 to 565, 571 to 575, and 581 to 585 and the tabs.

The first lines 511 and 512 may be formed along one column for every three columns of the pixel array, and the first lines 511 and 512 may be coupled to the A tabs of the first pixels P11, P31, P51, P24, P44 and P64 of the corresponding column. The first lines 511 and 512 may supply a clock 0 in the first phase and supply a clock $\pi$ in the second phase. The first lines 511 and 512 may be formed as a straight line.

The first sub-lines 551 to 555 may supply a clock to the A tabs of the first pixels P22, P42, P62, P33, P53, P35 and P55 of the neighboring columns of a column in which the first lines 511 and 512 are positioned. The first sub-lines 551 to 555 may be formed as a polygonal line for coupling the A tabs of three neighboring first pixels. For example, as illustrated in FIG. 5, the first sub-line 554 may be a polygonal line for coupling the A tab of the first pixel P33, the A tab of the first pixel P24, and the A tab of the first pixel P35.

The second lines 521 and 522 may be formed along one column for every three columns of the pixel array, and the second lines 521 and 522 may be coupled to the B tabs of the first pixels P22, P42, P62, P15, P35 and P55 of the corresponding column. The second lines 521 and 522 may supply the clock $\pi$ in the first phase and supply the clock 0 in the second phase. The second lines 521 and 522 may be formed as a straight line.

The second sub-lines 561 to 565 may supply a clock to the B tabs of the first pixels P31, P51, P33, P53, P24, P44, P64, P26, P46 and P66 of the columns that are positioned adjacent to the column where the second lines 521 and 522 are positioned. The second sub-lines 561 to 565 may be formed as a polygonal line for coupling the A tabs of the three neighboring first pixels. For example, as illustrated in FIG. 5, the second sub-line 565 may be a polygonal line that couples the B tab of the first pixel P64, the B tab of the first pixel P55, and the B tab of the first pixel P66.

The third lines 531 and 532 may be formed along one row for every three rows of the pixel array, and the third lines 531 and 532 may couple the A tabs of the second pixels P12, P14, P16, P41, P43 and P45 of the corresponding row. The third lines 531 and 532 may supply a clock $\pi/2$ in the first phase and a clock $3\pi/2$ in the second phase. The third lines 531 and 532 may be formed as a straight line.

The third sub-lines 571 to 575 may supply a clock to the A tabs of the second pixels P23, P25, P32, P34, P36, P52, P54 and P56 of the rows that are positioned adjacent to the row where the third lines 531 and 532 are positioned. The third sub-lines 571 to 575 may be formed as a polygonal line for coupling the A tabs of the three neighboring second pixels. For example, as illustrated in FIG. 5, the third sub-line 573 may be a polygonal line that couples the A tab of the second pixel P32, the A tab of the second pixel P41, and the A tab of the second pixel P52.

The fourth lines 541 and 542 may be formed along one row for every three rows of the pixel array, and the fourth lines 541 and 542 may couple the B tabs of the second pixels P21, P23, P25, P52, P54 and P56 of the corresponding row. The fourth lines 541 and 542 may supply the clock $3\pi/2$ in the first phase and the clock $\pi/2$ in the second phase. The fourth lines 541 and 542 may be formed as a straight line.

The fourth sub-lines 581 to 585 may supply a clock to the B tabs of the second pixels P12, P14, P16, P32, P34, P36, P43, P45, P63 and P65 of the rows that are positioned adjacent to the row in which the fourth lines 541 and 542 are positioned. The fourth sub-lines 581 to 585 may be formed as a polygonal line for coupling the B tabs of the three neighboring second pixels. For example, as illustrated in FIG. 5, the fourth sub-line 581 may be a polygonal line that couples the B tab of the second pixel P12, the B tab of the second pixel P21, and the B tab of the second pixel P32.

In FIG. 5, there may be overlapping lines, and the overlapping lines may be wired in different layers.

FIGS. 3 to 5 illustrate that pixels are arranged in 6 rows and 6 columns in the pixel array. However, it is obvious to those skilled in the art to which the present invention pertains that an actual pixel array may include pixels that are arranged in thousands to tens of thousands of rows and thousands to tens of thousands of columns.

According to the embodiment of the present invention, clocks of diverse phases may be efficiently supplied to a pixel array of an image sensor.

While the present invention has been described with respect to the specific embodiments, it will be apparent to those skilled in the art that various changes and modifications may be made without departing from the spirit and scope of the invention as defined in the following claims.

What is claimed is:

1. An image sensor, comprising:
   a plurality of first lines transferring a first clock having the same phase as a phase of a modulated light in a first phase and transferring a third clock having a phase difference of a ½ cycle from the phase of the modulated light in a second phase;
   a plurality of second lines transferring the third clock in the first phase and transferring the first clock in the second phase;
   a plurality of third lines transferring a second clock having a phase difference of a ¼ cycle from the phase of the modulated light in the first phase and transferring a fourth clock having a phase difference of a ¾ cycle from the phase of the modulated light in the second phase;
   a plurality of fourth lines transferring the fourth clock in the first phase and transferring the second clock in the second phase; and
   a pixel array including a plurality of first pixels and a plurality of second pixels that are alternately arranged in a row direction and a column direction,
   wherein each of the first pixels includes an A tab to which one of the first lines is coupled and a B tab to which one of the second lines is coupled, and
   wherein each of the second pixels includes an A tab to which one of the third lines is coupled and a tab B to which one of the fourth lines is coupled.

2. The image sensor of claim 1,
   wherein an A tab of a first pixel of K-th row and L-th column, an A tab of a first pixel of (K−1)-th row and (L−1)-th column, and an A tab of a first pixel of (K+1)-th row and (L−1)-th column are coupled to the same first line among the first lines, and a B tab of the first pixel of K-th row and L-th column, a B tab of the first pixel of (K−1)-th row and (L−1)-th column, and a B tab of the first pixel of (K+1)-th row and (L−1)-th column are coupled to the same second line among the second lines in the pixel array, and
   wherein an A tab of a second pixel of (K+1)-th row and L-th column, an A tab of a second pixel of K-th row and (L+1)-th column, and an A tab of a second pixel of (K+2)-th row and (L+1)-th column are coupled to the same third line among the third lines, and a B tab of the second pixel of (K+1)-th row and L-th column, a B tab of the second pixel of K-th row and (L+1)-th column, and a B tab of the second pixel of (K+2)-th row and (L+1)-th column are coupled to the same fourth line among the fourth lines in the pixel array.

3. The image sensor of claim 2,
   wherein the same first line is formed as a straight line from the A tab of the first pixel of (K−1)-th row and (L−1)-th column to the A tab of the first pixel of K-th row and L-th column, and as a straight line from the A tab of the first pixel of K-th row and L-th column to the A tab of the first pixel of (K+1)-th row and (L−1)-th column,
   wherein the same second line is formed as a straight line from the B tab of the first pixel of (K−1)-th row and (L−1)-th column to the B tab of the first pixel of K-th row and L-th column, and as a straight line from the B tab of the first pixel of K-th row and L-th column to the B tab of the first pixel of (K+1)-th row and (L−1)-th column,
   wherein the same third line is formed as a straight line from the A tab of the second pixel of K-th row and (L+1)-th column to the A tab of the second pixel of (K+1)-th row and L-th column, and as a straight line from the A tab of the second pixel of (K+1)-th row and L-th column to the A tab of the second pixel of (K+2)-th row and (L+1)-th column, and
   wherein the same fourth line is formed as a straight line from the B tab of the second pixel of K-th row and (L+1)-th column to the B tab of the second pixel of (K+1)-th row and L-th column, and as a straight line from the B tab of the second pixel of (K+1)-th row and L-th column to the B tab of the second pixel of (K+2)-th row and (L+1)-th column.

4. The image sensor of claim 1, wherein the first lines, the second lines, the third lines, and the fourth lines are formed to alternately contact two columns in the pixel array in zigzag and to proceed in a column direction.

5. The image sensor of claim 1, wherein distance information of the first pixel is generated
by combining information obtained from the A and B tabs of the first pixel and information obtained from the A and B tabs of four second pixels that are positioned adjacent to the first pixel in the first phase, and
by combining the information obtained from the A and B tabs of the first pixel and the information obtained from the A and B tabs of the four second pixels that are positioned adjacent to the first pixel in the second phase.

6. An image sensor, comprising:
a pixel array in which a plurality of first pixels and a plurality of second pixels are alternately arranged in a row direction and a column direction;
a plurality of first lines formed along odd columns among the columns of the pixel array, coupled to A tabs of the first pixels of a corresponding column, transferring a first clock having the same phase as a phase of modulated light in a first phase, and transferring a third clock having a phase difference of a ½ cycle from the phase of the modulated light in a second phase;
a plurality of second lines formed along the odd columns among the columns of the pixel array, coupled to B tabs of the first pixels of a corresponding column, transferring the third clock in the first phase, and transferring the first clock in the second phase;
a plurality of third lines formed along even columns among the columns of the pixel array, coupled to A tabs of the second pixels of a corresponding column, transferring a second clock having a phase difference of a ¼ cycle from the phase of the modulated light in the first phase, and transferring a fourth clock having a phase difference of a ¾ cycle from the phase of the modulated light in the second phase; and
a plurality of fourth lines formed along the even columns among the columns of the pixel array, coupled to B tabs of the second pixels of a corresponding column, transferring the fourth clock in the first phase, and transferring a third clock in the second phase.

7. The image sensor of claim 6, further comprising:
a plurality of first sub-lines suitable for transferring the first clock in the first phase and transferring the third clock in the second phase by coupling the A tabs of the first pixels of the odd columns to the A tabs of the first pixels that are positioned at a next column and a next row with respect to the first pixels of the odd columns;
a plurality of second sub-lines suitable for transferring the third clock in the first phase and transferring the first clock in the second phase by coupling the B tabs of the first pixels of the odd columns to the B tabs of the first pixels that are positioned at the next column and the next row with respect to the first pixels of the odd columns;
a plurality of third sub-lines suitable for transferring the second clock in the first phase and transferring the fourth clock in the second phase by coupling the A tabs of the second pixels of the even columns to the A tabs of the second pixels that are positioned at a next column and a next row with respect to the second pixels of the even columns; and
a plurality of fourth sub-lines suitable for transferring the fourth clock in the first phase and transferring the second clock in the second phase by coupling the B tabs of the second pixels of the even columns and the B tabs of the second pixels that are positioned at the next column and the next row with respect to the second pixels of the even columns.

8. The image sensor of claim 7, wherein the first sub-lines, the second sub-lines, the third sub-lines, and the fourth sub-lines are formed as a straight line.

9. An image sensor, comprising:
a pixel array including a plurality of first pixels and a plurality of second pixels that are alternately arranged in a row direction and a column direction;
a plurality of first lines formed along one column for every three columns of the pixel array, coupled to A tabs of the first pixels of a corresponding column, transferring a first clock having the same phase as a phase of modulated light in a first phase, and transferring a third clock having a phase difference of a ½ cycle from the phase of the modulated light in a second phase;
a plurality of second lines formed along columns next to the columns where the first lines are formed, coupled to the A tabs of the first pixels of a corresponding column, transferring the third clock in the first phase, and transferring the first clock in the second phase;
a plurality of third lines formed along one row for every three rows of the pixel array, coupled to A tabs of the second pixels of a corresponding row, transferring a second clock having a phase difference of a ¼ cycle from the phase of the modulated light in the first phase, and transferring a fourth clock having a phase difference of a ¾ cycle from the phase of the modulated light in the second phase; and
a plurality of fourth lines formed along rows next to the rows where the third lines are formed, coupled to the B tabs of the second pixels of a corresponding column, transferring the fourth clock in the first phase, and transferring the second clock in the second phase.

10. The image sensor of claim 9, further comprising:
a plurality of first sub-lines suitable for transferring the first clock in the first phase and transferring the third clock in the second phase by coupling the A tabs of the first pixels coupled to the first lines to the A tabs of two neighboring first pixels;
a plurality of second sub-lines suitable for transferring the third clock in the first phase and transferring the first clock in the second phase by coupling the B tabs of the first pixels coupled to the second lines to the B tabs of two neighboring first pixels;
a plurality of third sub-lines suitable for transferring the second clock in the first phase and transferring the fourth clock in the second phase by coupling the A tabs of the second pixels coupled to the third lines to the A tabs of two neighboring second pixels; and
a plurality of fourth sub-lines suitable for transferring the fourth clock in the second phase and transferring the second clock in the first phase by coupling the B tabs of the second pixels coupled to the fourth lines to the B tabs of two neighboring second pixels.

11. The image sensor of claim 10, wherein the first sub-lines, the second sub-lines, the third sub-lines, and the fourth sub-lines are formed in a polygonal line coupling three tabs.

12. An image sensor, comprising a pixel array including a plurality of first pixels and a plurality of second pixels that are alternately arranged in a row direction and a column direction,
- wherein each of the first pixels and the second pixels includes an A tab and a B tab,
- wherein, in a first phase operation, a first clock is applied to the A tabs of the first pixels, and a third clock having a phase difference of a ½ cycle from a phase of the first clock is applied to the B tabs of the first pixels, and a second clock having a phase difference of a ¼ cycle from the phase of the first clock is applied to the A tabs of the second pixels, and a fourth clock having a phase difference of a ¾ cycle from the phase of the third clock is applied to the B tabs of the second pixels, and
- wherein, in a second phase operation, the third clock is applied to the A tabs of the first pixels, and the first clock is applied to the B tabs of the first pixels, and the fourth clock is applied to the A tabs of the second pixels, and the second clock is applied to the B tabs of the second pixels.

13. The image sensor of claim 12, wherein the first clock has the same frequency and phase as those of modulated light.

* * * * *